US010153976B2

(12) United States Patent
Goemaere et al.

(10) Patent No.: US 10,153,976 B2
(45) Date of Patent: Dec. 11, 2018

(54) ADAPTIVE LOAD BALANCING IN RESIDENTIAL HYBRID GATEWAYS

(71) Applicant: THOMSON Licensing, Issy-les-Moulineaux (FR)

(72) Inventors: Geert Goemaere, Schoten (BE); Olivier Lafontaine, Woluwe Saint Lambert (BE); Jurgen Schoeters, Ranst (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/552,280

(22) PCT Filed: Feb. 15, 2016

(86) PCT No.: PCT/EP2016/053088
§ 371 (c)(1),
(2) Date: Aug. 20, 2017

(87) PCT Pub. No.: WO2016/131737
PCT Pub. Date: Aug. 25, 2016

(65) Prior Publication Data
US 2018/0041440 A1    Feb. 8, 2018

(30) Foreign Application Priority Data
Feb. 20, 2015  (EP) .................................... 15305262

(51) Int. Cl.
*H04L 12/803* (2013.01)
*H04W 28/08* (2009.01)
(Continued)

(52) U.S. Cl.
CPC ........ *H04L 47/125* (2013.01); *H04L 12/2854* (2013.01); *H04L 45/22* (2013.01);
(Continued)

(58) Field of Classification Search
None
See application file for complete search history.

(56) References Cited

U.S. PATENT DOCUMENTS 7,027,566 B2 * 4/2006 Bossemeyer, Jr. .......................... H04L 12/6418 379/88.02
7,283,505 B1 * 10/2007 Meenan .............. H04L 12/2814 370/338

(Continued)

FOREIGN PATENT DOCUMENTS

EP    2774278    9/2014
EP    2789133    10/2014
(Continued)

*Primary Examiner* — Brian Roberts
(74) *Attorney, Agent, or Firm* — Brian J. Dorini; Patricia A. Verlangieri (57) ABSTRACT

A residential gateway has a first, wired data connection and a second, wireless data connection. At least the second data connection connects to a network node which at least temporarily maintains simultaneous connections to at least one residential gateway and at least one mobile station. The residential gateway is communicatively connected to a load balancing controller. A method of operating the residential gateway for controlling load balancing comprises the residential gateway sending a registration request to the load balancing controller. The registration request comprises an identification of the residential gateway and an identification of the network node to which the residential gateway is communicatively connected. The residential gateway receives a listening address from which it receives load balancing control messages, and listens for load balancing control messages from the listening address. In response to a corresponding load balancing control message the residential gateway reduces or increases a maximum allowed data traffic on its second data connection.

13 Claims, 6 Drawing Sheets

(51) Int. Cl.
  *H04L 12/28*     (2006.01)
  *H04L 12/707*    (2013.01)
  *H04W 88/16*     (2009.01)
  *H04W 84/12*     (2009.01)

(52) U.S. Cl.
  CPC ........... *H04W 28/08* (2013.01); *H04W 88/16* (2013.01); *H04W 84/12* (2013.01)

(56) References Cited

U.S. PATENT DOCUMENTS

| | | | |
|---|---|---|---|
| 8,279,892 B2 | 10/2012 | Denney et al. | |
| 8,606,742 B1 | 12/2013 | Relyea | |
| 8,861,458 B2 | 10/2014 | Dai et al. | |
| 2004/0073640 A1 | 4/2004 | Martin et al. | |
| 2005/0089052 A1* | 4/2005 | Chen | H04L 12/2803 370/401 |
| 2006/0209857 A1* | 9/2006 | Hicks, III | G08B 25/08 370/401 |
| 2012/0026865 A1* | 2/2012 | Fan | H04W 24/00 370/225 |

FOREIGN PATENT DOCUMENTS

| | | |
|---|---|---|
| WO | WO2011129070 | 10/2011 |
| WO | WO2013066956 | 5/2013 |
| WO | WO2013085486 | 6/2013 |

* cited by examiner

ADAPTIVE LOAD BALANCING IN RESIDENTIAL HYBRID GATEWAYS

This application claims the benefit, under 35 U.S.C. § 365 of International Application PCT/EP2016/053088, filed Feb. 15, 2016, which was published in accordance with PCT Article 21(2) on Aug. 25, 2016, in English, and which claims the benefit of European Patent Application 15305262.6, filed Feb. 20, 2015.

FIELD

The present method and apparatus relate to adaptive load balancing in residential hybrid gateways.

BACKGROUND

With the rapid growth of Internet bandwidth requirements, network operators are looking for cost-effective solutions to meet subscribers' expectations. An alternative to upgrading existing wired networks or to installing expensive optical networks for replacing existing copper wire infrastructure is to continue using existing Internet access lines, e.g. various variants of digital subscriber lines (xDSL, x being replaced with a descriptor for the variant) or cable, and adding additional network capacity at residential gateways located at the subscribers' premises using wireless access, e.g. as stipulated in the Global System for Mobile Communications (GSM) standard, in the Universal Mobile Telecommunications System (UMTS) standard or in the Long Term Evolution (LTE) standard for mobile network access. Accordingly, a gateway device installed in the customer premises will have access to two or more different connection types and will use these connections exclusively or jointly for providing the required data bandwidth. Such gateway devices are also referred to as hybrid gateways.

WO 2011129070 discloses a handover method and apparatus for a user equipment device attaching to a LIPA domain. The apparatus includes multiple home NodeBs or home eNodeBs being wired with a service gateway and a LIPA gateway serving the LIPA domain.

SUMMARY

A hybrid gateway in the context of the description of the present method and apparatus is a gateway that connects one or more user devices to a wide area network (WAN) and ultimately provides access to the internet over an individual one or a combination of these two or more different-type data connections. Typically, one of the data connections comprises one of xDSL and cable, and the other data connection is of a different type comprising one of GSM, UMTS, LTE and the like. Other combinations and connection types are conceivable, and the hybrid gateway is not restricted to a combination of a wired and a wireless connection.

In order to properly manage the use of bandwidth provided by the two or more connections the hybrid gateway performs load balancing, i.e., distributes the network traffic to and from the subscriber's devices across the available data connections. Load balancing algorithms may exclusively use one data connection as long as the bandwidth provided by that connection is sufficient for the subscriber's requirements, and add bandwidth from other data connections only in case a higher bandwidth is required, either temporarily or over a longer time period. Adding bandwidth may be termed 'boosting' the bandwidth. The added bandwidth may be used for a presently existing connection established by a user device, e.g. by using a multipath transmission control protocol (MTCP), or may be used for newly established connections.

If added bandwidth is provided to hybrid gateways over UMTS or LTE, or any other wireless network, e.g. a data connection of a next generation mobile network, or, more generally, a shared medium network that is also used for providing voice and data services to mobile subscribers, situations may occur in which a large portion or even the entire available bandwidth is consumed by the hybrid gateways, leaving no or only limited service capacity to mobile subscribers. It is reminded that hybrid gateways have access to the Internet through multiple data connections, while mobile subscribers do not have such backup option. This may frequently occur in densely populated areas and may be considered unfair to the mobile subscribers. Also, mobile subscribers are likely to subscribe to another provider's service in case the user experience is poor or suffers from frequent unavailability of the service.

It is thus desirable to provide a method and an apparatus that allows a network operator to offer additional network capacity to residential Internet users while providing satisfactory services to mobile subscribers.

Unless otherwise noted, in the context of this specification the expression 'data traffic' is used synonymously for an amount of data, i.e. the number of bits received or transmitted, or a data rate, i.e. the number of bits received or transmitted during a predetermined time interval. The data rate is typically expressed in bits per second or bytes per second, and may be used with commonly used prefixes indicating orders of magnitude, like 'kilo' for thousand, 'mega' for million, or their binary equivalents 'kibi' and 'mebi'. The expression 'maximum data traffic' may relate to asymmetric data traffic, i.e. maximum limits for data traffic received by a gateway, or downstream data traffic, may be different from limits for data traffic transmitted from a gateway, or upstream data traffic. The term 'communicated', when used in connection with data, indicates data that is either received or sent, or both, unless otherwise noted or obvious from the context.

The present methods of operating a residential gateway for controlling load balancing and of operating a load balancing controller address the shortcomings and drawbacks mentioned above. It builds on the availability of fallback options in the hybrid gateways and on a fair on-demand distribution of network capacity amongst the subscribers. The present method allows for operators to provide additional bandwidth and capacity to residential gateways without overly compromising mobile user's service experience and without massive investment in fixed line infrastructure.

A residential gateway for use in accordance with the present method has a first, wired data connection and a second, wireless data connection. At least the second data connection connects to a network node which at least temporarily maintains simultaneous connections to at least one residential gateway and at least one mobile station. Typical examples of a first data connection comprise fixed line interfaces such as an xDSL or a cable interface in accordance with the DOCSIS standard (Data Over Cable Service Interface Specification). Typical examples of a second data connection comprise wireless interfaces in accordance with the LTE standard, the UMTS standard or a data connection of a next generation mobile network.

The residential gateway is communicatively connected to a load balancing controller. In accordance with the present method the residential gateway sends a registration request to the load balancing controller. The registration request comprises an identification of the residential gateway and an identification of the network node to which the residential gateway is communicatively connected. Throughout this specification the expression 'communicatively connected' refers to a communicative connection between devices and base stations. The term 'communicatively' indicates that data can be transmitted between connected devices. The physical nature of the connection, i.e. wired or wireless, as well as any communication protocols involved, depend on the context of the devices and their interaction and are irrelevant unless otherwise noted or obvious from the context. In response to the registration request the residential gateway receives a listening address from which it receives load balancing control messages. The residential gateway receives load balancing control messages from the load balancing controller under the previously received listening address. In response to a corresponding load balancing control message received from the listening address the residential gateway adjusts, i.e. reduces or increases, a maximum allowed data traffic on its second data connection. Load balancing in the gateway is performed by a load balancing agent provided in the gateway.

Load balancing between the first and the second data connection of a gateway is performed in accordance with the bandwidth or data traffic requirements of one or more clients communicatively connected to the residential gateway. Typically, the first data connection, e.g. the DSL connection, is used as the default connection for accessing a wide area network (WAN) and ultimately the Internet. The load balancing agent monitors the network load on the first data connection and, if required, uses the second data connection for increasing the total bandwidth available to the subscriber in case the first data connection is maxed out, i.e. has reached its maximum capacity. It is to be noted that the maximum capacity of the first data connection may be variable over time. The load balancing agent determines, for any given point in time, if a higher bandwidth demand cannot be satisfied by the first data connection and dynamically adds further bandwidth using the second data connection. When load balancing, or bandwidth boosting, is enabled in a residential gateway it is still possible that the maximum allowed data traffic on the second data connection is not fully used, or even that the second data connection is not used at all. This may happen if the total data traffic provided by the first data connection is sufficient for the requirements of the one or more clients communicatively connected to the residential gateway.

In accordance with an embodiment of the present method reducing the maximum allowed data traffic comprises disabling load balancing involving the second data connection, and increasing the maximum allowed data traffic comprises enabling load balancing involving the second data connection. Disabling the load balancing involving the second data connection does not preclude that a residential gateway keeps receiving broadcast or multicast transmissions over the second data connection. For example, a residential gateway may still receive control messages from a load balancing controller over the second data connection. Rather, disabling the load balancing involving the second data connection refers to the residential gateway not actively using the second data connection for load balancing. The residential gateway may still distribute the total traffic required by multiple communicatively connected clients over the maximum traffic the first data connection is capable of providing.

In accordance with an embodiment of the present method the residential gateway listens for load balancing control messages on the second data connection. This may be useful in case the first and the second data connection have no common endpoints outside of the residential gateway. In this case control communication within a logical group formed by multiple residential gateways having their second data connections going to the same network node may be easiest using the second data connection.

A residential gateway for use in accordance with the present method has a at least one microprocessor, a non-volatile memory, a random access memory, a first and a second data connection, an interface for connecting at least one client device, a router section and a load balancing agent. The non-volatile memory stores program instructions that, when executed by the microprocessor, cause the residential gateway to execute the present method or variants and developments thereof.

The router section may comprise dedicated hardware components as well as control modules that are implemented by software routines executed by one or more of the at least one microprocessor. The load balancing agent may likewise comprise control modules implemented by software routines executed by one or more of the at least one microprocessor.

The load balancing agent controls the router section in accordance with general load balancing functionality and further in accordance with the present method or variants and developments thereof described hereinbefore.

A load balancing controller that sends control messages to residential gateways as described above, for controlling load balancing in these residential gateways, comprises at least one communication interface, a registration module, an evaluation module and a memory module. The registration module and the evaluation module may implemented by software routines executed by a microprocessor. The microprocessor may be dedicated to performing the functionality of the load balancing controller or may also perform other tasks. The load balancing controller may be a separate entity or may be integrated in a residential gateway as described further above. In the latter case multiple of such residential gateways may jointly provide the load balancing controller functionality, or may negotiate and determine at least one residential gateway to provide the load balancing controller functionality.

A method of operating the load balancing controller described above comprises receiving a registration request from at least one residential gateway. The registration request comprises an identification of the residential gateway and an identification of a network node to which the at least one residential gateway is communicatively connected. In response to the registration request, the registration module of the load balancing controller provides a listening address to the at least one residential gateway. Multiple residential gateways communicatively connected to the same network node are provided the same listening address. In accordance with the method the load balancing controller receives data indicative of a network load from at least one network node identified in a registration request.

In case the received data indicates that the network load in a network node exceeds a first threshold value, the load balancing controller sends a control message to the at least one residential gateway communicatively connected to that network node. The control message is sent using the listening address provided to the residential gateways communicatively connected to that network node, and the control message instructs the at least one residential gateway to reduce the maximum allowed data traffic over its second data connection. In case the received data indicates that the network load in a network node is below a second threshold value the load balancing controller sends a control message instructing the at least one residential gateway to increase the maximum allowed data traffic over its second data connection. The first and second threshold value may be identical, or may be different, e.g. for implementing a hysteresis in order to avoid too frequent adaptation of the load balancing in the residential gateways.

The control message instructing to reduce the maximum allowed data traffic over the second data connection may comprise instructing the residential gateway to disable load balancing involving the second data connection. Similarly, the control message instructing to increase the maximum allowed data traffic over the second data connection may comprise instructing the residential gateway to enable load balancing involving the second data connection.

In an embodiment of the present method the load balancing controller communicates with the residential gateway over the residential gateway's second data connection.

In a communication system the residential gateway and the load balancing controller cooperate, each component performing the method or embodiments and developments thereof as laid out hereinbefore. The load balancing controller receives and evaluates the data indicating a network load of a network node, and sends corresponding control messages to residential gateways, which in response to the control messages, reduce or increase the maximum allowed data traffic going to or received from the network node via their respective second data connections.

DESCRIPTION OF DRAWINGS

In the following section embodiments of the method will be described in greater detail with reference to the drawings, in which.

DETAILED DESCRIPTION OF EMBODIMENTS

In the figures same or similar elements and features are referenced using the same reference designators.

Figure 1:
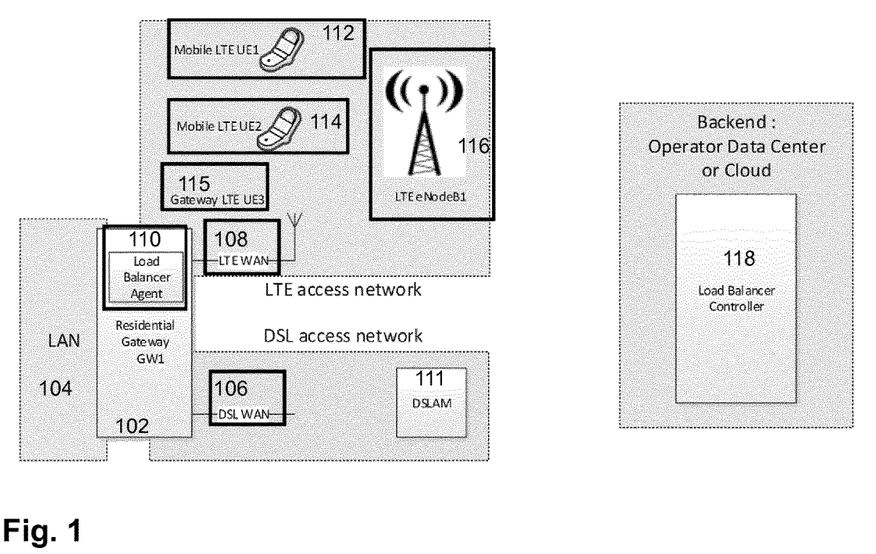
FIG. 1 shows an exemplary system environment in which the present method can be executed.

FIG. 1 shows an exemplary system environment in which the present method can be executed. Residential gateway 102 provides a local area network (LAN) 104 to computers and other electronic devices (not shown) within a subscriber's premises. Residential gateway 102 may also provide a wireless LAN access (not shown). Residential gateway 102 further has a first data connection 106 to a wide area network (WAN) over a digital subscriber line (DSL). The first data connection 106 connects gateway 102 to a DSL access multiplexer (DSLAM) 111, which is communicatively connected to a provider network that is part of the WAN and ultimately provides access to the Internet (not shown). Residential gateway 102 yet further has a second data connection 108 to a WAN over a Long Term Evolution (LTE) connection. LTE is a wireless telecommunication standard developed by the $3^{rd}$ Generation Partnership Project (3GPP). LTE user equipment (UE) devices are communicatively connected to base stations, also referred to as ENodeB (Evolved Node B). These LTE base stations provide access to the LTE operator's mobile core network. It is noted that the first and the second data connection may communicatively connect the residential gateway to separate WANs that are communicatively connected at some remote point for providing access to the same resource, e.g. the Internet. FIG. 1 further shows mobile LTE UEs 112, 114 and gateway LTE UE3 115, that are also communicatively connected to the same ENodeB 116 as gateway 102, and yet further shows load balancing controller 118. In the exemplary environment shown in FIG. 1 load balancing controller 118 is located in an operator's data center or in a cloud-based system. Residential gateway 102 has a load balancing agent 110 that performs load balancing in accordance with control commands provided by load balancing controller 118.

Figure 2:
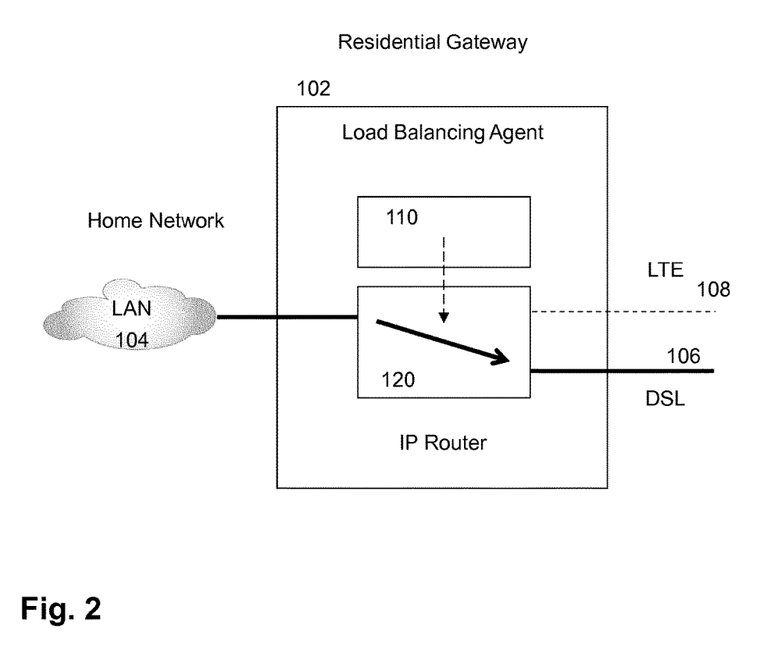
FIG. 2 shows a first schematic representation of conventional routing of data traffic between a LAN and a WAN across a residential gateway.

FIG. 2 shows a first schematic representation of conventional routing of data traffic between a LAN and a WAN across residential gateway 102. The general system environment corresponds to the one shown in FIG. 1 (not all elements are shown in the figure). As long as the network load on the residential gateway, i.e. used bandwidth between LAN 104 and the WAN side, does not exceed the DSL bandwidth capacity, residential gateway 102 routes all traffic over DSL interface 106. To this end load balancing agent 110 controls router section 120 to route the entire data traffic over the DSL interface. LTE interface 108 is not used, even though it may have a maximum allowed data traffic set to a non-zero value.

Figure 3:
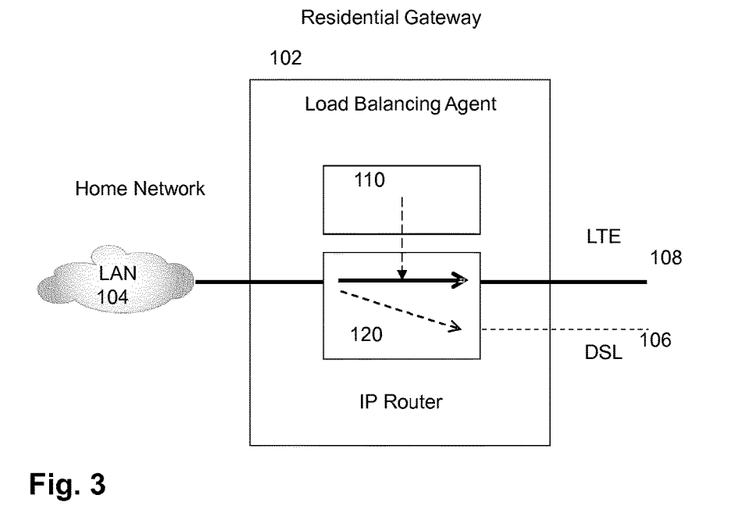
FIG. 3 shows a second schematic representation of conventional routing of data traffic between a LAN and a WAN across a residential gateway.

FIG. 3 shows a second schematic representation of conventional routing of data traffic between the LAN and the WAN across residential gateway 102. In FIG. 2 the network load on DSL interface 106 exceeds a predetermined threshold, e.g. 80% of the maximum downstream capacity of DSL connection 106 is used. Load balancing agent 110 updates the default route in residential gateway 102 and controls router section 120 so that new data traffic requests from LAN 104 are routed to LTE network 108. All new internet connections from that moment on will use LTE 108 as WAN interface. Existing connections between LAN devices and the Internet will still be routed over DSL interface 106.

Figure 4:
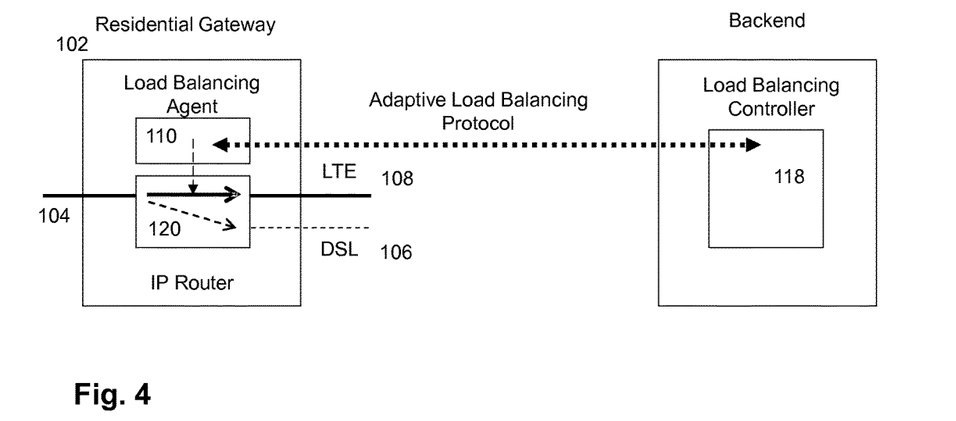
FIG. 4 shows a system setup in accordance with the present method for adaptive routing of data traffic between the LAN and the WAN across a residential gateway.

FIG. 4 shows a system setup in accordance with the present method for adaptive routing of data traffic between the LAN and the WAN across residential gateway 102. Residential gateway 102 corresponds to the one described in FIGS. 2 and 3. However, in the system setup of FIG. 4 load balancing controller 118 is added and is in communication with residential gateway 102 or, more specifically, with load balancing agent 110 provided in residential gateway 102.

Figure 5:
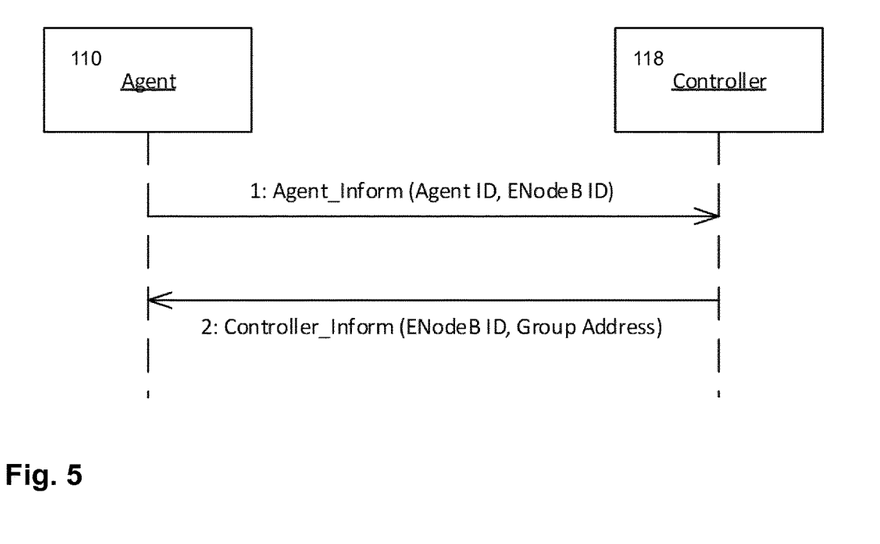
FIG. 5-8 show message and event flows in accordance with various aspects of the present method.

FIG. 5 shows a first message flow between load balancing agent 110 and load balancing controller 118 in the exemplary system setup of FIG. 1 in accordance with one aspect of the present method. When connecting to the LTE network load balancing agent 110 in residential gateway 102 (not shown) registers with load balancing controller 118, e.g. by sending an Agent ID and an ID of the ENodeB it is communicatively connected to. Load balancing controller 118 stores the Agent ID and the ENodeB ID tuple in an agent registration table for later lookup. An example for an agent registration table is shown in table 1:

TABLE 1

| Load Balancing Agent ID | ENodeB ID |
|---|---|
| GW 1 | ENodeB 2 |
| GW 2 | ENodeB 1 |

Load balancing controller 118 responds with a multicast address to which load balancing agent 110 must listen for receiving control commands.

Figure 6:
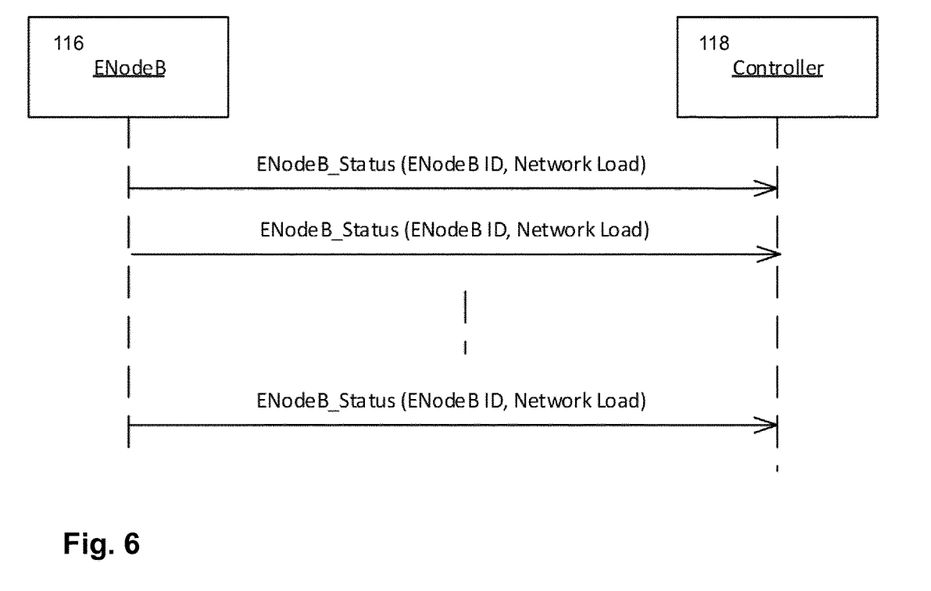

FIG. 6 shows a second message flow between ENodeB 116 and load balancing controller 118 in the exemplary system setup of FIG. 1 in accordance with another aspect of the present method. The ENodeBs in the operator's mobile radio access network continuously monitor the network load generated by LTE User Equipment devices and periodically report the network load to the load balancing controller. The report may be sent directly to the load balancing controller, or may be relayed to the load balancing controller through at least one of the residential gateways. The arrows shown in FIG. 6 represent the messages sent from ENodeB 116 to load balancing controller 118.

For each ENodeB device in the LTE radio access network, load balancing controller 118 maintains a table containing the ENodeB ID, its associated multicast group address and network load status. An example for an ENodeB status table is shown in table 2:

TABLE 2

| ENodeB ID | Multicast Group Address | Network Load |
|---|---|---|
| ENodeB 2 | MC Address 2 | 60% |
| ENodeB 1 | MC Address 1 | 80% |

Figure 7:
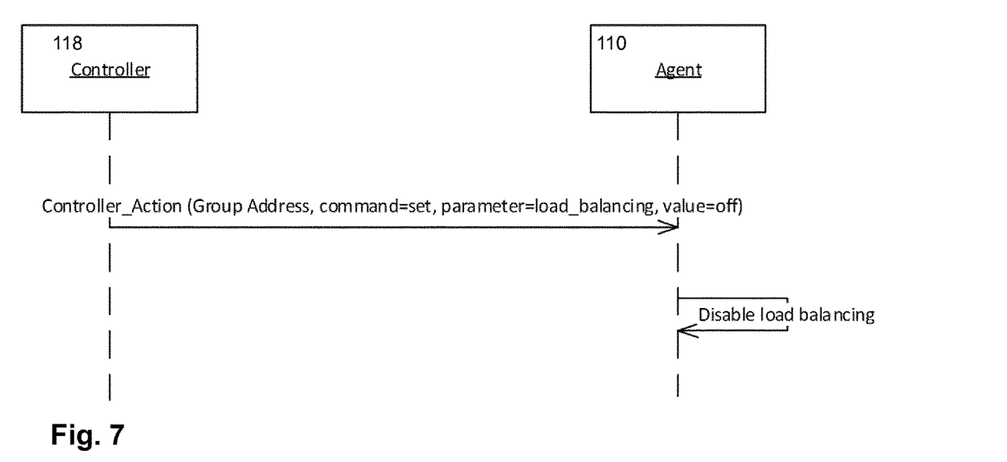

If load balancing controller 118 detects that an ENodeB's network load exceeds a predefined overload threshold, it looks up the multicast address related to the overloaded ENodeB device in the EnodeB status table and multicasts an action reducing or disabling load balancing involving LTE on residential gateways communicatively connected to this ENodeB. All load balancing agents 110 listening to that multicast address will receive the command and will reduce or stop sending or requesting new network traffic over the LTE interface, which will result in more bandwidth becoming available from that ENodeB for mobile user equipment, e.g. smartphones. FIG. 7 shows a message and event flow in accordance with this aspect of the present method. In response to the command from load balancing controller 118 load balancing agent 110 disables load balancing involving the LTE connection. It is to be noted that alternatively the maximum available bandwidth for load balancing involving LTE may be adjusted rather than completely disabling load balancing involving LTE.

Figure 8:
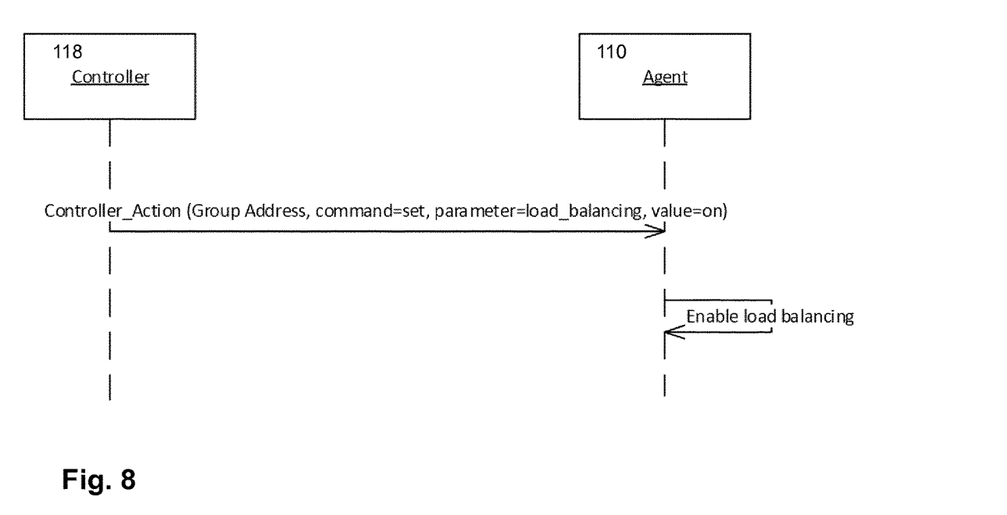

As stated before, the ENodeBs continuously monitor their network load and report the network load to the load balancing controller. If load balancing controller 118 detects that an ENodeB's network load falls below a predefined threshold, it looks up the multicast address related to the overloaded ENodeB in the EnodeB status table and multicasts an action enabling or increasing load balancing involving LTE on residential gateways communicatively connected to this ENodeB. A corresponding message and event flow is shown in FIG. 8. As mentioned before all load balancing agents listening to that multicast address will receive the command and will enable load balancing on the LTE interface or increase the maximum available bandwidth for load balancing involving LTE. In an embodiment of the present method load, balancing controller 118 will use a hysteresis on the overload threshold to avoid frequent toggling between disabling or reducing and enabling or increasing of load balancing in the load balancing agents.

While the present method has been described with reference to an environment in which the first data connection is a DSL WAN connection and the second data connection is an LTE connection it is obvious that other types and combinations of first and second data connections are conceivable.

Figure 9:
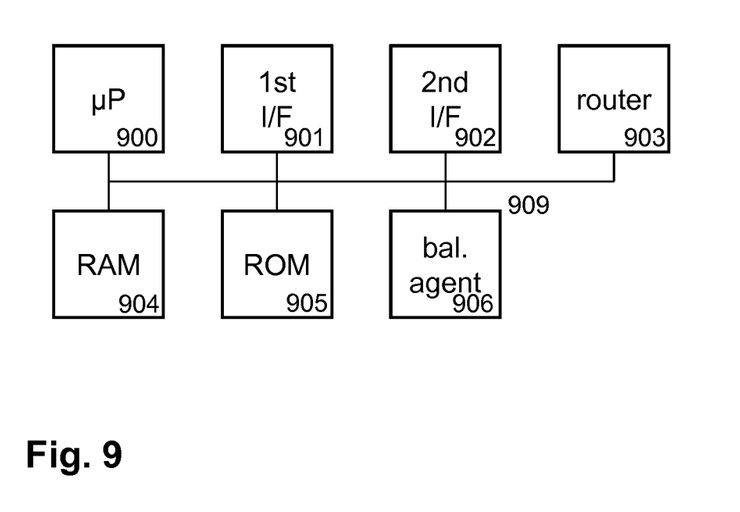
FIG. 9 shows an exemplary block diagram of a residential gateway that can be used in accordance with the present method or embodiments and developments thereof.

FIG. 9 shows an exemplary block diagram of a residential gateway that can be used in accordance with the present method or embodiments and developments thereof. Microprocessor 900 is connected with first data connection 901, second data connection 902, router section 903, random access memory 904, non-volatile memory 905 and load balancing agent 906 over at least one data bus connection 909. Non-volatile memory 905 stores program instructions which, when executed by microprocessor 900, perform one or more embodiments and/or developments of the present method described hereinbefore. It is to be noted that individual ones of the function blocks may be implemented by a corresponding software that is executed by microprocessor 900, e.g., load balancing agent 906. Further, microprocessor 900 may represent multiple microprocessors or multiple microprocessor cores, and random access memory 904 may be implemented as one large physical memory space that is logically separated or as separate physical memory spaces. It is further to be noted that not all elements and interconnections necessary for complete operation of the residential gateway are shown for clarity reasons. These elements are well known to those skilled in the art.

Figure 10:
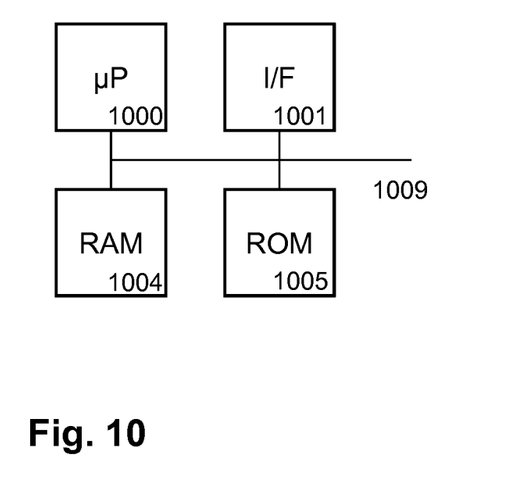
FIG. 10 shows an exemplary block diagram of a load balancing controller that can be used in accordance with the present method or embodiments and developments thereof.

FIG. 10 shows an exemplary block diagram of a load balancing controller that can be used in accordance with the present method or embodiments and developments thereof. Microprocessor 1000 is connected with data connection 1001, random access memory 1004 and non-volatile memory 1005 over at least one data bus connection 1009. Non-volatile memory 1005 stores program instructions which, when executed by microprocessor 1000, perform one or more embodiments and/or developments of aspects of the present method described hereinbefore. It is to be noted that microprocessor 1000 may represent multiple microprocessors or multiple microprocessor cores, and random access memory 1004 may be implemented as one large physical memory space that is logically separated or as separate physical memory spaces. Further, the load balancing controller may be implemented as a software function within a networked apparatus also performing various other functions. It is further to be noted that not all elements and interconnections necessary for complete operation of the load balancing controller are shown for clarity reasons. These elements are well known to those skilled in the art.

Figure 11:
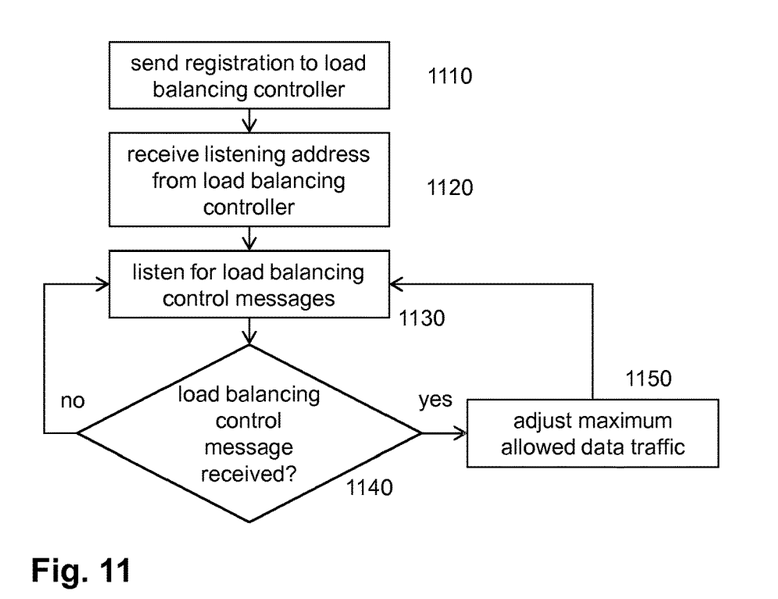
FIG. 11 shows a simplified exemplary flow diagram of steps executed in a residential gateway in accordance with the present method.

FIG. 11 shows a simplified exemplary flow diagram of steps executed in a residential gateway in accordance with the present method. In step 1110 the residential gateway sends a registration request to the load balancing controller. The registration request comprises an identification of the residential gateway and an identification of the network node to which the residential gateway is communicatively connected. In return, in step 1120, the residential gateway receives a listening address from the load balancing controller from which it receives load balancing control messages, and listens, in a loop including step 1130, for load balancing control messages from the load balancing controller under the listening address. When a load balancing message is received, 'yes'-branch of step 1140, a load balancing agent in the residential gateway accordingly adjusts a maximum allowed data traffic on a second data connection, step 1150, and continues listening for load balancing control messages. It is to be noted that, while the method shown exemplarily in FIG. 11 is implemented using a listening loop, it may also be implemented in a polling fashion, i.e. the load balancing agent may periodically or prior to certain events poll the load balancing controller for load balancing control messages.

Figure 12:
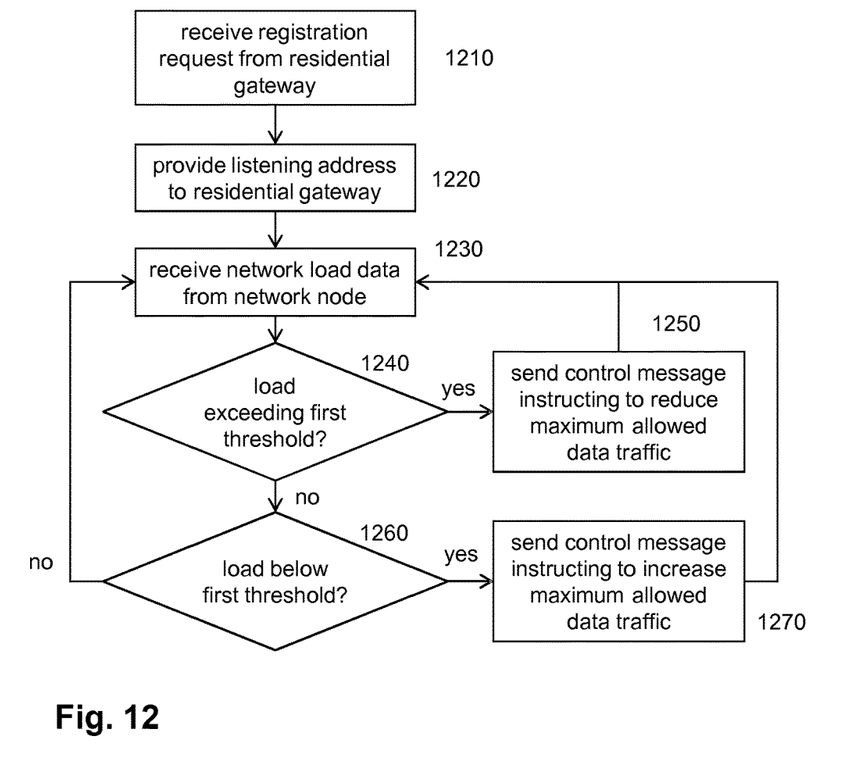
FIG. 12 shows a simplified exemplary flow diagram of steps executed in a load balancing controller in accordance with the present method.

FIG. 12 shows a simplified exemplary flow diagram of steps executed in a load balancing controller in accordance with the present method. In step 1210 the load balancing controller receives a registration request from at least one residential gateway. The registration request comprises an identification of the at least one residential gateway and an identification of a network node to which the at least one residential gateway is communicatively connected. In response to the request, in step 1220, the load balancing controller provides a listening address to the at least one residential gateway. One listening address is provided to multiple residential gateways communicatively connected to the same network node. In a loop including step 1230 the load balancing controller receives data indicative of a network load from at least one network node identified in a registration request. In case the received data indicates that the network load in a network node exceeds a first threshold value, 'yes'-branch of step 1240, the load balancing controller sends, in step 1250, a control message to the at least one residential gateway communicatively connected to that network node instructing the at least one residential gateway to reduce the maximum allowed data traffic over its second data connection, and goes back to receiving network load data. The control message is sent using the listening address provided to the residential gateways communicatively connected to that network node. In case the received data indicates that the network load in a network node is below a second threshold value, 'yes'-branch of step 1260, the load balancing controller sends, in step 1270, a control message to the at least one residential gateway communicatively connected to that network node instructing the at least one residential gateway to increase the maximum allowed data traffic over its second data connection, and continues receiving network load data. It is to be noted that, while the method shown exemplarily in FIG. 12 is implemented using a receiving loop, it may also be implemented in a polling fashion, i.e. the load balancing agent may periodically or prior to certain events poll the network load data from network nodes. While in this exemplary flow diagram the control messages are sent to the residential gateway it is readily apparent to the skilled person that the control messages are ultimately destined to a load balancing agent in the residential gateway.

The invention claimed is:

1. A method of operating a residential gateway for controlling load balancing, the residential gateway having a first, wired data connection and a second, wireless data connection, wherein at least the second data connection connects to a network node which at least temporarily maintains simultaneous connections to at least one residential gateway and at least one mobile station and data is communicated over the second data connection only in case a specified data rate on the first data connection is lower than a required data rate, the residential gateway being communicatively connected to a load balancing controller, the method comprising, at the residential gateway:

sending a registration request to the load balancing controller, the registration request comprising an identification of the residential gateway and an identification of the network node to which the residential gateway is communicatively connected;

receiving a listening address from the load balancing controller from which it receives load balancing control messages;

receiving load balancing control messages from the load balancing controller under the listening address; and in response to a corresponding load balancing control message, adjusting a maximum allowed data traffic on its second data connection.

2. The method of claim 1, wherein reducing the maximum allowed data traffic comprises disabling load balancing involving the second data connection, and wherein increasing the maximum allowed data traffic comprises enabling load balancing involving the second data connection.

3. The method of claim 1, wherein the specified data rate is a bandwidth capacity of the first data connection, and wherein as long as the network load on the residential gateway does not exceed the bandwidth capacity of the first data connection, the residential gateway routes all traffic over the first data connection; and if the network load on the first data connection exceeds a threshold, a load balancing agent controls a router section so that new data traffic requests are routed to the second data connection.

4. The method of claim 1, wherein the residential gateway receives load balancing control messages over the second data connection.

5. The method of claim 1, wherein the wired data connection is a DSL data connection and the wireless data connection is a UMTS, LTE or a data connection of any other wireless network.

6. A residential gateway comprising a microprocessor, a first, wired data connection, a second, wireless data connection, a router section, a random access memory, a non-volatile memory, a load balancing agent and at least one data bus, wherein at least the second data connection connects to a network node which at least temporarily maintains simultaneous connections to at least one residential gateway and at least one mobile station and data is communicated over the second data connection only in case a specified data rate on the first data connection is lower than a required data rate, the residential gateway being communicatively connected to a load balancing controller, wherein the non-volatile memory stores instructions that, when executed by microprocessor in cooperation with random access memory, cause the residential gateway to execute:

sending a registration request to the load balancing controller, the registration request comprising an identification of the residential gateway and an identification of the network node to which the residential gateway is communicatively connected;

receiving a listening address from the load balancing controller from which it receives load balancing control messages;

receiving load balancing control messages from the load balancing controller under the listening address; and in response to a corresponding load balancing control message, adjusting a maximum allowed data traffic on its second data connection.

7. A method of operating a load balancing controller for controlling load balancing in residential gateways, the residential gateways having a first, wired data connection and a second, wireless data connection, wherein at least the second data connection connects to a network node which at least temporarily maintains simultaneous connections to at least one residential gateway and at least one mobile station, the method comprising at the load balancing controller:

receiving a registration request from at least one residential gateway, the registration request comprising an identification of the at least one residential gateway and an identification of a network node to which the at least one residential gateway is communicatively connected;

in response to the registration request, providing a listening address to the at least one residential gateway, wherein one listening address is provided to multiple residential gateways communicatively connected to the same network node;

receiving data indicative of a network load from at least one network node identified in a registration request;

in case the received data indicates that the network load in a network node exceeds a first threshold value, the method comprises sending a control message to the at least one residential gateway communicatively connected to that network node, wherein the control message is sent using the listening address provided to the residential gateways communicatively connected to that network node, and wherein the control message instructs the at least one residential gateway to reduce the maximum allowed data traffic over its second data connection; and in case the received data indicates that the network load in a network node is below the first threshold value, the method comprises sending a control message to the at least one residential gateway communicatively connected to that network node instructing the at least one residential gateway to increase the maximum allowed data traffic over its second data connection.

8. The method of claim 7, wherein instructing the at least one residential gateway to reduce the maximum allowed data traffic comprises instructing to disable load balancing involving the second data connection, and wherein instructing the at least one residential gateway to increase the maximum allowed data traffic comprises instructing to enable load balancing involving the second data connection.

9. The method of claim 7, wherein the load balancing controller communicates with the at least one residential gateway over the at least one residential gateway's second data connection.

10. The method of claim 7, wherein the wired data connection is a DSL data connection and the wireless data connection is a UMTS or LTE data connection, or a data connection of any other wireless network.

11. A load balancing controller for controlling load balancing in residential gateways, the residential gateways having a first, wired data connection and a second, wireless data connection, wherein at least the second data connection connects to a network node which at least temporarily maintains simultaneous connections to at least one residential gateway and at least one mobile station, the load balancing controller comprising a microprocessor, a data connection, a random access memory, a non-volatile memory and at least one data bus, wherein the non-volatile memory stores instructions that, when executed by a microprocessor in cooperation with a random access memory, cause the load balancing controller to execute:

receiving a registration request from at least one residential gateway, the registration request comprising an identification of the at least one residential gateway and an identification of a network node to which the at least one residential gateway is communicatively connected;

in response to the registration request, providing a listening address to the at least one residential gateway, wherein one listening address is provided to multiple residential gateways communicatively connected to the same network node;

receiving data indicative of a network load from at least one network node identified in a registration request;

in case the received data indicates that the network load in a network node exceeds a first threshold value, the method comprises sending a control message to the at least one residential gateway communicatively connected to that network node, wherein the control message is sent using the listening address provided to the residential gateways communicatively connected to that network node, and wherein the control message instructs the at least one residential gateway to reduce the maximum allowed data traffic over its second data connection; and in case the received data indicates that the network load in a network node is below the first threshold value, the method comprises sending a control message to the at least one residential gateway communicatively connected to that network node instructing the at least one residential gateway to increase the maximum allowed data traffic over it second data connection.

12. A communication system comprising:

a load balancing controller comprising a microprocessor, a data connection, a random access memory, a non-volatile memory and at least one data bus; and at least one residential gateway comprising a microprocessor, a first data connection, a second data connection, a router section, a random access memory, a non-volatile memory, a load balancing agent and at least one data bus, wherein at least the second data connection connects to a network node which at least temporarily maintains simultaneous connections to at least one residential gateway and at least one mobile station;

wherein the residential gateway is configured to execute the method of claim 1.

13. A communication system comprising:

a load balancing controller comprising a microprocessor, a data connection, a random access memory, a non-volatile memory and at least one data bus; and at least one residential gateway comprising a microprocessor, a first data connection, a second data connection, a router section, a random access memory, a non-volatile memory, a load balancing agent and at least one data bus, wherein at least the second data connection connects to a network node which at least temporarily maintains simultaneous connections to at least one residential gateway and at least one mobile station;

wherein the residential gateway is configured to:
    send a registration request to the load balancing controller, the registration request comprising an identification of the residential gateway and an identification of the network node to which the residential gateway is communicatively connected;
    receive a listening address from the load balancing controller from which it receives load balancing control messages;
    receive load balancing control messages from the load balancing controller under the listening address; and
    in response to a corresponding load balancing control message, adjust a maximum allowed data traffic on its second data connection, and wherein the load balancing controller is configured to execute the method of claim 7.

* * * * *